United States Patent
Wied et al.

(10) Patent No.: US 7,690,786 B2
(45) Date of Patent: Apr. 6, 2010

(54) DEVICE FOR CHANGING BRIDGES, SIDE ARMS AND BROWBARS OF RIMLESS SPECTACLES AND FOR CHANGING BRIDGES AND SIDE ARMS OF METALLIC AND PLASTIC SPECTACLE FRAMES

(76) Inventors: Guenther Wied, Max-Emanuel-Str. 2, Passan (DE) 94036; Michael Strenz, Passauerstr. 14, Vilshofen (DE) 94474

( * ) Notice: Subject to any disclaimer, the term of this patent is extended or adjusted under 35 U.S.C. 154(b) by 98 days.

(21) Appl. No.: 11/663,285

(22) PCT Filed: May 2, 2006

(86) PCT No.: PCT/DE2006/000765

§ 371 (c)(1),
(2), (4) Date: Mar. 20, 2007

(87) PCT Pub. No.: WO2006/116988

PCT Pub. Date: Nov. 9, 2006

(65) Prior Publication Data
US 2008/0100793 A1 May 1, 2008

(30) Foreign Application Priority Data
May 4, 2005 (DE) ......... 10 2005 020 738
Jun. 8, 2005 (DE) ......... 10 2005 026 260

(51) Int. Cl.
*G02C 1/02* (2006.01)
(52) U.S. Cl. .................................... 351/110
(58) Field of Classification Search .......... 351/110, 351/41, 158, 124, 131
See application file for complete search history.

(56) References Cited

U.S. PATENT DOCUMENTS

| 5,412,440 | A | * | 5/1995 | Takeda et al. | 351/110 |
| 6,007,199 | A | | 12/1999 | Yang | |
| 6,210,002 | B1 | * | 4/2001 | Tachibana | 351/110 |
| 6,896,367 | B1 | * | 5/2005 | Sohn | 351/110 |
| 7,249,844 | B2 | * | 7/2007 | Sakai | 351/110 |
| 2004/0169815 | A1 | | 9/2004 | Lambert | |

FOREIGN PATENT DOCUMENTS

| DE | 42 19 039 | | 12/1883 |
| WO | WO 2005/033781 | | 10/2004 |
| WO | WO 2004/107021 | A1 * | 5/2008 |

* cited by examiner

*Primary Examiner*—Hung X Dang
(74) *Attorney, Agent, or Firm*—Hoffman Wasson & Gitler

(57) ABSTRACT

In exchangeable spectacle frames, in which the side arms and bridge are fastened to the lenses or central part of the spectacle frame by a support element, the support element is a rod-shaped, rail-shaped or plate-shaped metal part with a metallic threaded pin and an additional metallic positioning pin or threaded pin. The metallic or plastic end of the side arm on the side of the lens, or the connecting element between the support element and metallic or plastic side arm, is shaped with recesses which are adapted to the form of the support element, have the same length as the metallic part and engage the metallic part. The recesses in the side arm form at least two catches on the lateral, inner plastic interfaces which interact with the threaded pin and positioning pin. Alternatively, the side arms or bridges are made of an elastic material with a slit-shaped recess, in which recesses are located for form-fittingly receiving the pins of the support element and locking them after their insertion.

13 Claims, 6 Drawing Sheets

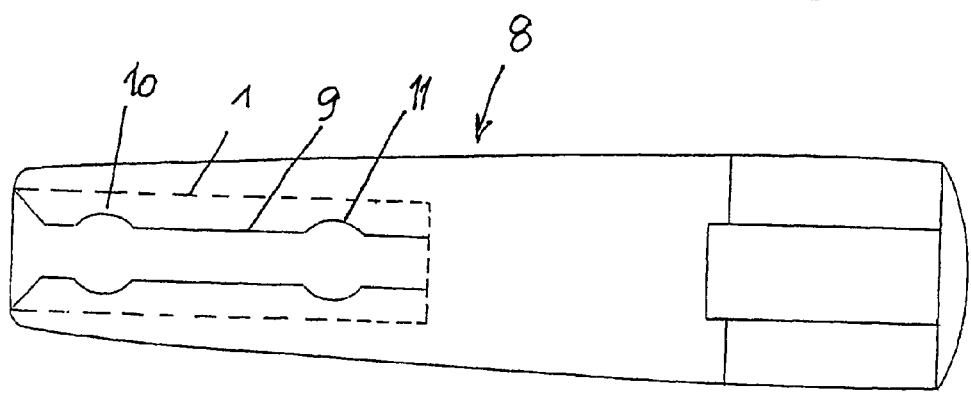
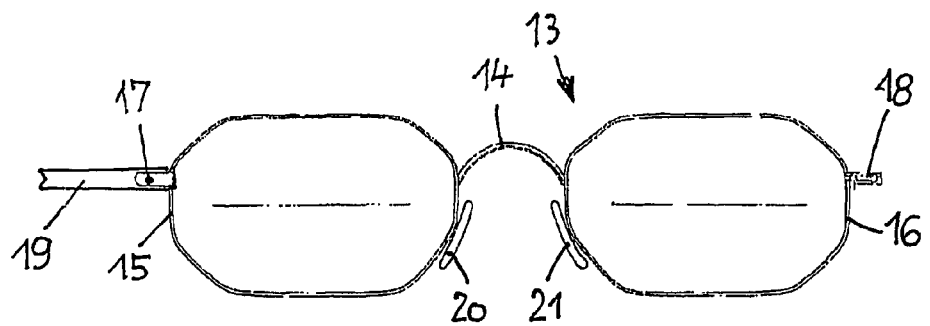
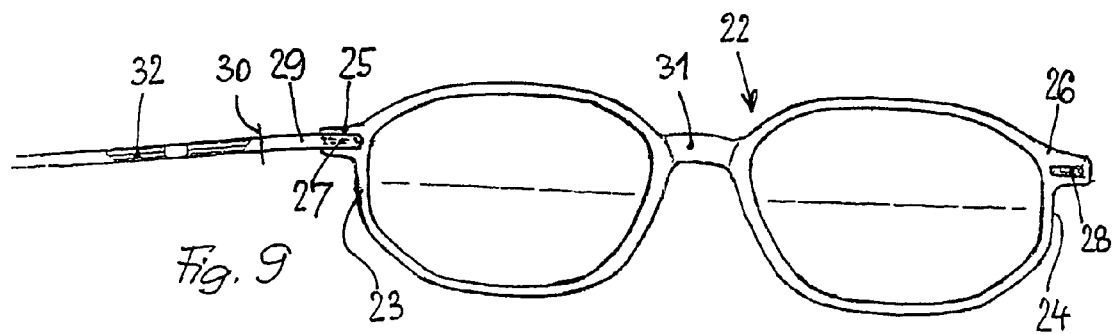

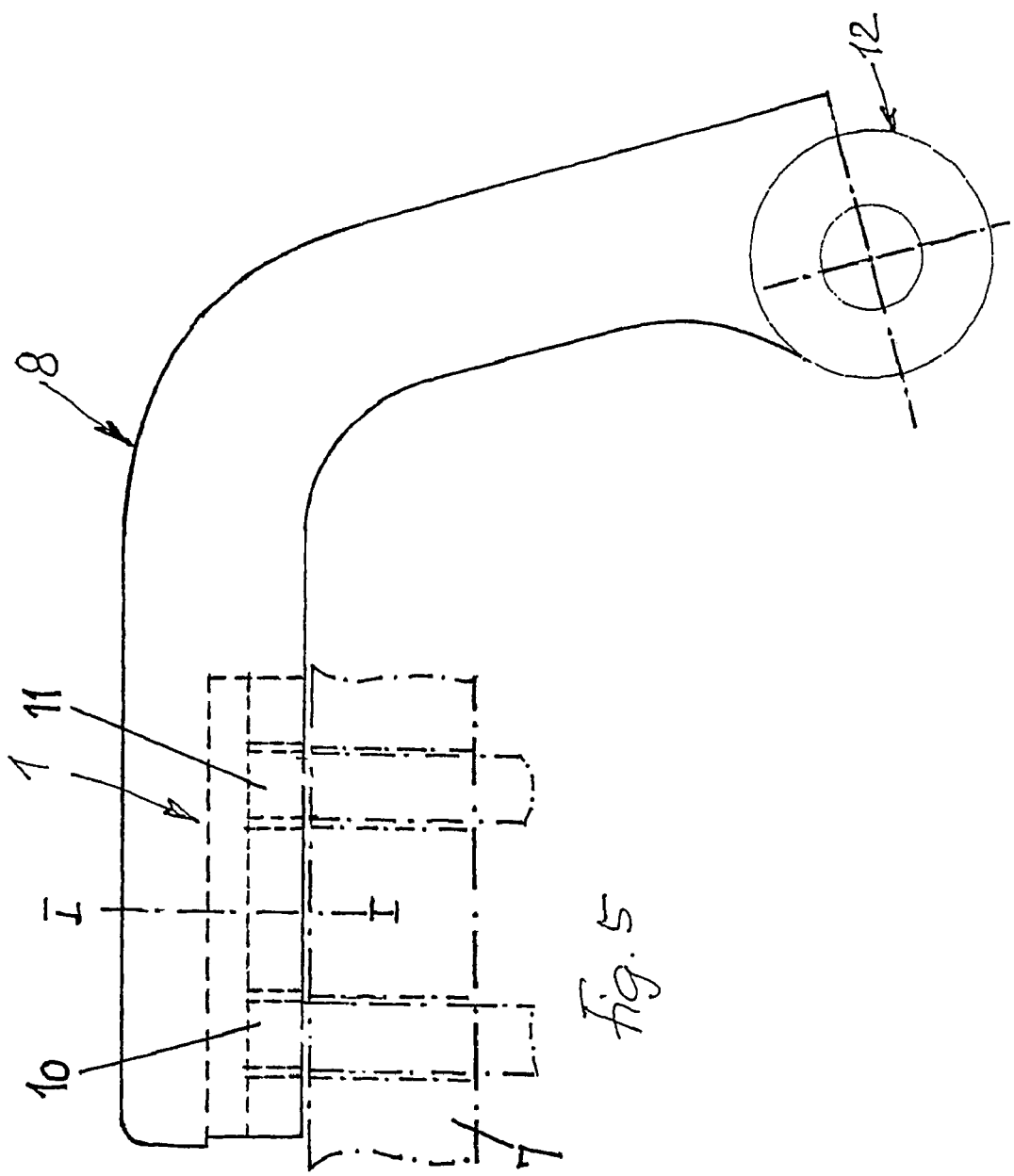
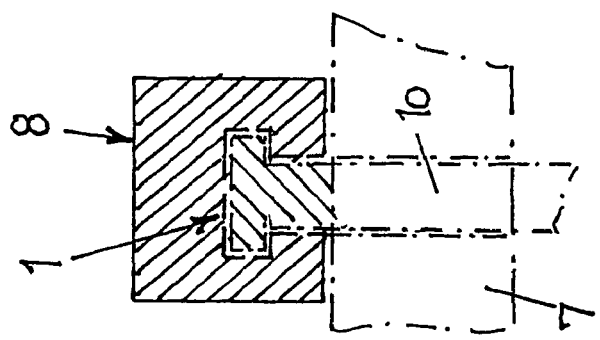

DEVICE FOR CHANGING BRIDGES, SIDE ARMS AND BROWBARS OF RIMLESS SPECTACLES AND FOR CHANGING BRIDGES AND SIDE ARMS OF METALLIC AND PLASTIC SPECTACLE FRAMES

BACKGROUND OF THE INVENTION

The invention relates to devices as for changing individual parts of a frame for rimless eyeglasses or full-framed eyeglasses.

Eyeglass wearers are increasingly demanding glasses which are made to be changeable and in which lenses matched to individual requirements can be varied and combined with various eyeglass frames. In this respect reference is made to numerous proposals in the literature in which frames of rimless eyeglasses are connected to the lenses by screw connections such that connecting elements, holding members or the like are clamped or screwed on the eyeglass lenses so that the eyeglass wearer or optician can relatively easily replace one frame by another. This repeated replacement however leads to the difficulty that valuable lenses in conjunction with rimless eyeglasses can be easily damaged so that handling the lens when the frame is being changed is not accepted by the market.

(US 2004/0169815 A1) discloses a system for attachment of side arms to rimless eyeglasses in which the side arms are made interchangeable, so that the eyeglasses wearer can keep his lenses when he intends to change the appearance of his eyeglasses. Only the side arms, but not the bridge, are replaced in this connection. For this changing process there is an L-shaped screw arrangement with two opposing ends provided with threads. The fastening system consists of a screw which is to be connected to the side arm and a screw to be connected to the lens. The former is made for example roughly to the plane of the lens, the latter roughly vertically to the plane of the lens. A nut is placed on the screw which penetrates the lens, while the screw connection to the side arm is made as a pin which engages a recess on the edge of the lens, so that twisting is prevented. The fastening device can also be made in two parts in one alternative embodiment, in this version the shaft which penetrates the lens having one cylindrical end for holding the shaft and the screw attachment which is screwed to the earpiece is joined to the cylindrical part. This system constitutes solely a screw connection system with two different screw elements, which is designed for changing the side arms.

The subject matter of (US 2003/0058402 A1) is a fastening system for connecting eyeglass lenses to the side pieces and bridges of the eyeglass frame to prevent the connecting elements from becoming loose, falling out and being lost. For this purpose plug elements with plastic sleeves are used, the plug elements instead of screw threads forming catch-like elements which are locked in the plastic sleeves. These plug elements are routed through holes in the eyeglass lens and the assigned hole of the side piece of the eyeglass frame through the lens, therefore vertically to the plane of the lens and the corresponding interlocks in the axis of rotation of the side piece which holds the side arm are inserted so that thus conventional screw connections are undertaken by snap fastener-like plug connections in two planes of the eyeglasses which are perpendicular to one another in order to achieve replacement. This plug connection can generally be brought together and released only with a tool or considerable expenditure of force, in doing so there being the danger that the eyeglass lens and/or the earpiece will be damaged.

(U.S. Pat. No. 6,210,002 B1) describes attachment of side pieces with lenses. The side piece on its eyeglass-side end has two shafts, one of which is arranged through a hole in the lens and the other is located outside the eyeglass lens. The two shafts are connected by their free end in an attachment block. The two shafts have catch elements which are elastically flexible and are connected to catch in sleeves of the attachment block so that instead of a screw connection an unthreaded clamp connection is formed. This connection takes place vertically to the plane of the lens and is closed or opened in the manner of a snap fastener.

It is an object of the invention to make interchangeable eyeglasses with rimless lenses such that the connection between the lens, the carrier element and the connector to the side piece part has high stability, the carrier element connected to the lens is completely overlapped by the connector part, locking or catching between the carrier element and connector part yields exact coupling which is free of play, and mounting when the frames are being changed is especially simple and gentle to the parts. Furthermore the object of the invention is to propose interchangeable eyeglasses with a metal or plastic frame, in which the carrier element is connected to the frame over its entire length and is completely overlapped from the connector part to the side piece part, locking or catching between the carrier element and connector part yielding exact coupling which is free of play, and mounting when the frames are being changed can be done especially easily by the wearer of the eyeglasses without tools as often as wished.

SUMMARY OF THE INVENTION

According to a first aspect of the invention, for rimless eyeglasses the carrier element is made as an essentially rod-shaped, rail-shaped or plate-shaped metal part, for example with a T-shaped cross section, with a threaded pin of metal and an additional positioning pin or selectively a second metal threaded pin with the pertinent hole in the eyeglass lens, the lens has a through hole which is spaced apart from the lens edge for holding the threaded pin and a recess on the lens edge for holding the positioning pin, the lens-side end of the plastic side piece or of the connector part on the side piece between the carrier element and the plastic side arm has a recess matched to the shape of the metal part with the length of the metal part and encompassing the latter, and the recess of the side piece has at least two catch sites on the inside plastic boundaries which are made to interact with the threaded pin and the positioning pin.

According to another aspect of the invention, for interchangeable eyeglasses with a plastic or metal frame the carrier element as a rod-shaped, rail-shaped or plate-shaped metal part, in a T-shape is attached to the earpiece-side ends of the middle part of the eyeglasses, the glass side end of the plastic side arm or of the connecting piece between the carrier element and the side arm is provided with a recess matched to the shape of the carrier element part with the length of the carrier element and encompassing the latter, and the recess of the side piece part is provided with at least two catch sites on the inside plastic boundaries which are made to interact with the pins of the carrier element.

With the proposal, for rimless eyeglasses as a result of screwing the metal carrier element into the lens, stable holding is ensured, with which at any time and as often as wished release of the carrier element from the lens is possible, the carrier element as a metal part enabling extremely high strength with at the same time a small projection over the surface of the eyeglass lens, securing by means of a screw connection yields high-quality fixing of the carrier element on the lens, when the frame is changed the entire carrier part is overlapped, and thus with respect to quality and design a major improvement over conventional devices is achieved.

Analogously to the version for rimless spectacles, in another configuration of the invention for metal or plastic framed eyeglasses, by using a metal carrier element a simple and advantageous changing device is achieved, using which the respective side piece part is comfortably pulled out of the carrier element under the action of manual force and an interchangeable side piece or interchangeable earpiece can be slipped on, when pulling-out and slipping-on the resistance of the double or also multiple catch site having to be overcome, but especially stable holding being achieved by this double or multiple catch site.

In another configuration of the invention, for changing the side piece parts there are carrier elements on the metal hinges for holding and attaching the side piece parts which are permanently connected to the stationary and the mobile part of the hinge and which have connecting devices which are made to be inserted or slipped on with the carrier element so that by simply pulling off the side piece and the earpiece of the side piece part and by slipping or sliding on a new side piece or a new earpiece the frame can be changed without any tool. In this connection the side piece has a corresponding connector part on the connection to the middle part of the eyeglass frame, which can be slipped or pushed onto the carrier element which is attached to the middle part.

Another special embodiment of the invention calls for the side piece or the section of the side piece facing the eyeglass lens to consist of elastic material, for example spring steel or special plastic so that the slotted execution of the insert opening of the side piece end widens in the manner of a prong when the plug-in connection is being established between the screw shaft and the catch receiver and accommodates the two screw shafts in succession by catching and returns again into the initial position. This results in an unambiguously defined and exact engagement position. In terms of material the connection can be metal/metal, metal/plastic or plastic/plastic, when a plastic material is used which on the one hand has extremely high strength and on the other high resetting force.

BRIEF DESCRIPTION OF THE DRAWINGS

The invention is explained below in conjunction with the drawings using one embodiment.

FIG. 4 shows the connector part (side piece) in a bottom view,

FIG. 5 shows the connector part (side piece) in a side view, and FIG. 5a in a section I-I, FIG. 8 shows a modified embodiment of the invention with a metal middle part, FIG. 9 shows another modified embodiment of the invention with a plastic middle part.

DETAILED DESCRIPTION OF THE INVENTION

Figure 2:
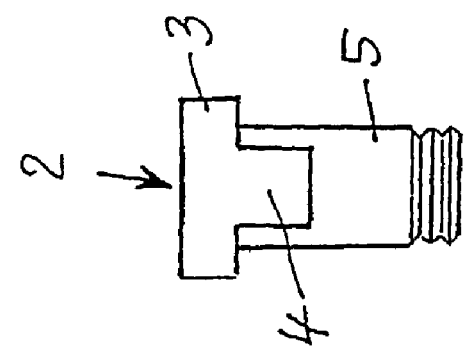
FIG. 2 shows the carrier element in a view from the right as shown in FIG. 1.
Figure 1:
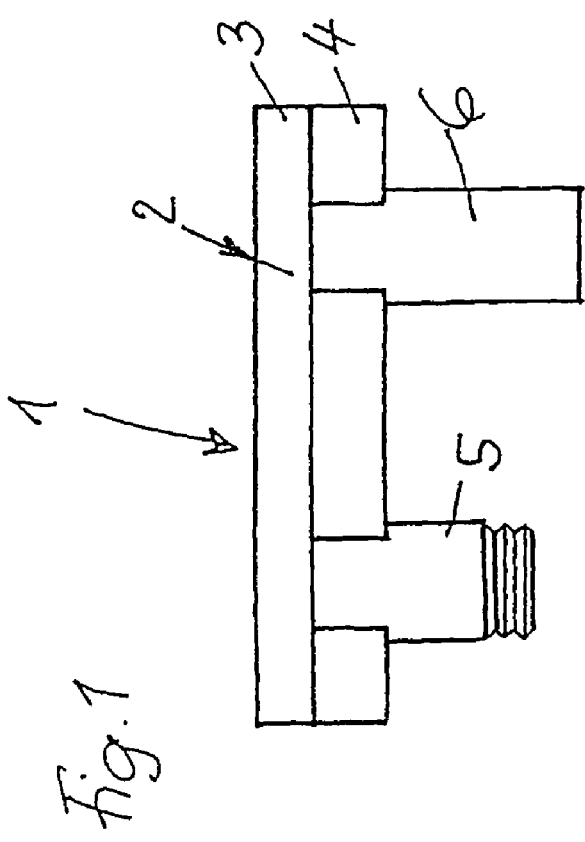
FIG. 1 shows the carrier element in a side view.
Figure 3:
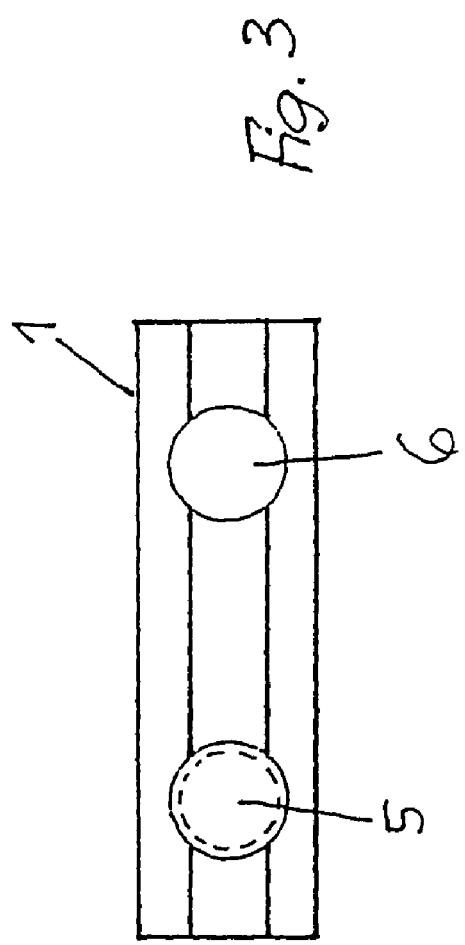
FIG. 3 shows the carrier element in a bottom view.

FIGS. 1-3 show in three different views which are each offset 90° to one another the carrier element 1 which is attached on the visible side of the eyeglass lens or the eyeglass frame. The carrier element 1 is a carrier-shaped metal component with a cross section in the shape of an oblong beam 3 and a shaft 4 of the same extension as the beam 3. Proceeding from the shaft 4, there are a screw pin 5 and a positioning pin 6 located at a distance to it or another threaded pin 6 with the carrier element 1 on the bottom of the beam 3, the shaft of the screw pin 5 as well as of the positioning pin 6 having a greater diameter than the cross section of the shaft 4. The threaded pin 5 is routed through a hole 5' (FIG. 6) in the eyeglass lens 7 and is subsequently shortened as required depending on the lens thickness and is fixed on the threaded pin by means of a nut. The positioning pin 6 is inserted into a partial hole 6' which is open on the edge of the lens so that the location of the carrier element 1 on the lens is definitively defined. Alternatively another threaded pin 6 can likewise be arranged to penetrate the eyeglass lens. The length of the carrier element 1 is determined by the distance of the two pins 5, 6 from one another, the hole of the threaded pin having to have a sufficient safety distance from the lens edge so that damage to the lens by drilling and stress is precluded.

The connector part 8 as shown in FIG. 4, for example the side piece, constitutes the part of the changing device which establishes the connection from the carrier element 1 to the side arm of the eyeglass frame. This connector part 8 is for example a plastic part which is slipped laterally onto the carrier element 1 and is integrated into one part of the eyeglass frame, especially the side piece. Since based on the changing device as claimed in the invention the eyeglass wearer is enabled to select instead of a certain frame a completely different frame, differently with respect to shape, design and color, it is necessary that for optimum appearance the connection part 8 can be pushed over the metal carrier element 1 to such an extent that the end of the metal carrier element ends flush with the end of the connector part. FIGS. 4 and 5 show in two different views offset by 90° the carrier element 1 by the broken line with the two pins indicated in FIG. 5, the threaded pin 5 and the positioning pin 6 (or selectively another threaded pin in the eyeglass lens) and the beam 3 of the carrier element 1, while FIG. 4 in a bottom view fully extended shows the recess which constitutes the guide for slipping-on with the two bilateral bulges 10 and 11 for holding the shaft of the threaded pin 5 and of the positioning pin 6. The connector part 8 consists preferably of plastic, likewise the boundary walls of the recess 9 which are slightly deformed when the connector part is pushed or slipped onto the carrier element 1 on the straight wall parts 9, while the pins 5 and 6 engage the bulges 10, 11 and thus assume a defined position when the pushing pressure is released. In FIG. 5 the articulated site is labeled 12; the side piece and earpiece of the eyeglass frame are articulated to one another.

Figure 6:
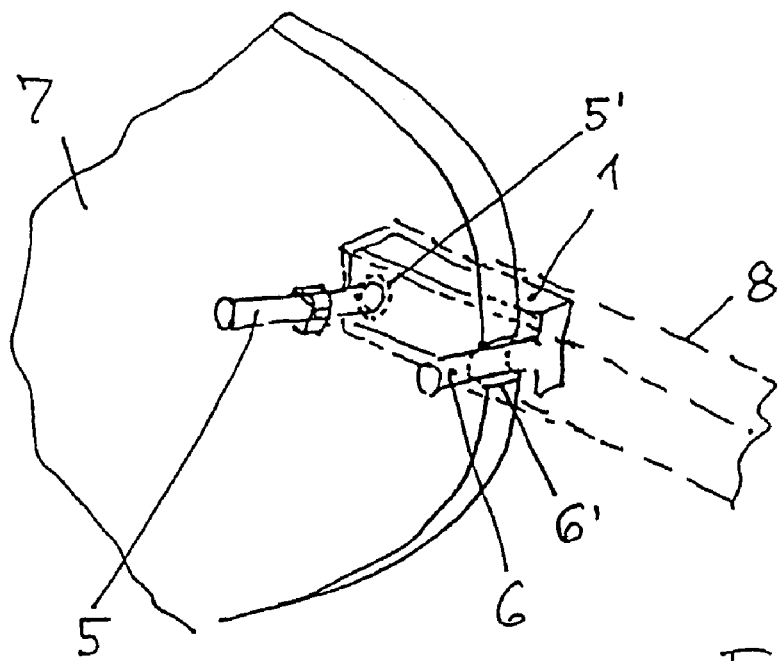
FIG. 6 shows a schematic of an eyeglass lens section with a device as claimed in the invention (on a reduced scale, while FIGS. 1-5 are shown on a 10:1 scale)
Figure 7:
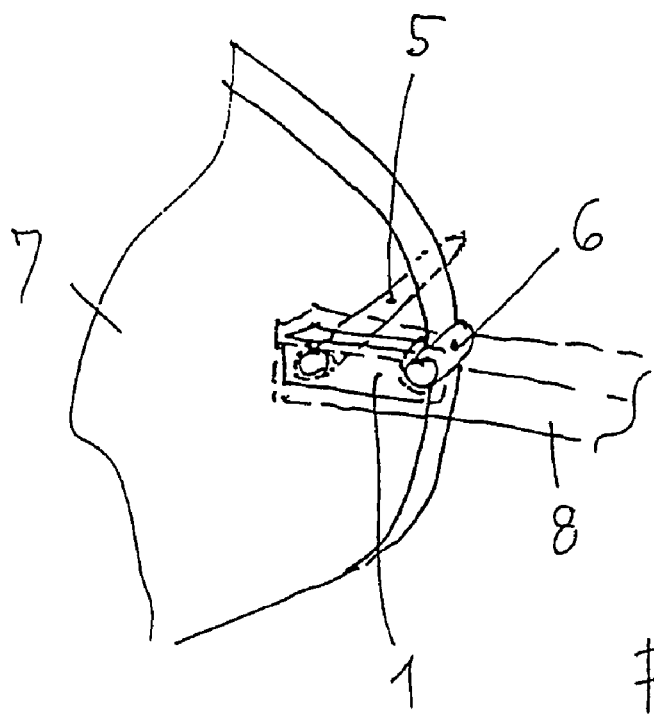
FIG. 7 shows a schematic of a lens section with the device as claimed in the invention, viewed from the opposite side.

FIGS. 6 and 7 each show a schematic of the connection of the carrier element 1 to the eyeglass lens 7, in FIG. 6 in a view of the inside of the lens, and in FIG. 7 in the opposite position.

Broken lines show the connector part 8 which has been slipped or pushed on. The lens 7 has a hole 5' for holding a threaded pin 5 and an open edge hole 6' for holding a positioning pin 6.

FIG. 8 shows eyeglasses with a metal frame, the entire middle part 13 of which including the bridge 14 consists of metal. On the outer sides 15, 16 of the middle part 13 carrier elements 17, 18 of metal in the form of holding plates are molded which are used as receiver carriers for the connector parts 8 to the side piece parts, which connector parts are shown in the preceding figures. In this embodiment the carrier elements 17, 18 are not connected to the eyeglass lens 7, but to the middle part 13 of the frame itself so that engagement with the lens is unnecessary when the side piece parts are to be changed. The bridge 14 and nose pads 20, 21 are permanently connected to the metal frame middle part 13.

Another embodiment for eyeglass frames of plastic with a middle part 22 is shown by FIG. 9. The middle part in this connection has extensions 25, 26 with carrier elements 27, 28 on the side outer boundaries 23, 24. A connector part 29 in the form of a side piece can be slipped or plugged onto the carrier element and is made analogously to the ones shown in the preceding figures, and holds a side arm 32 via a pivot joint 30 so that in this version the side arm 32 can be changed without intervention in the lenses. The bridge 31 in this embodiment can consist of plastic or metal and is an integrated component of the metal part 22, the middle part in the bridge region being shaped such that the frame parts which run down from the bridge 31 and which face away from the eyeglass lens are matched to the support surfaces of the nose or are made as pads. Alternately the side arms 32 can also be made such that they can be slipped directly onto the carrier elements without a connector part or side piece being provided.

Figure 11:
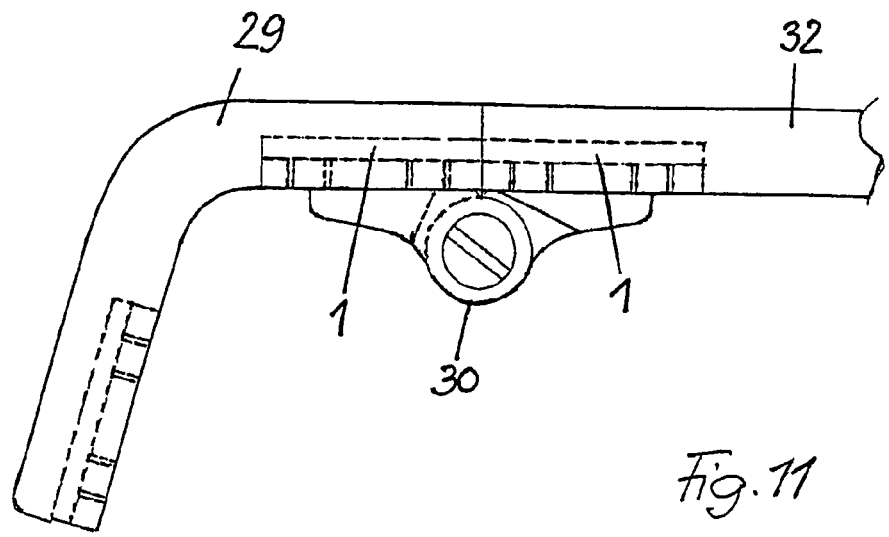
FIG. 11 shows a modified version as shown in FIG. 10 without the metal parts on the side piece and the earpiece.
Figure 10:
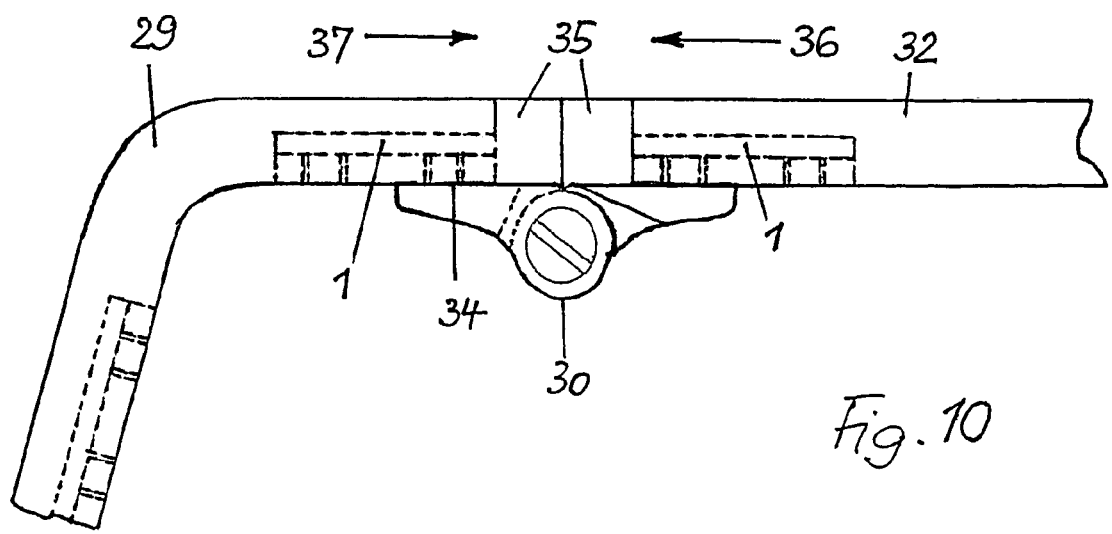
FIG. 10 shows a partial view of the side piece part with an earpiece which is can be pushed or slipped on, or a side piece which can be slipped on, as well as adjoining metal sections on the hinge.

With the embodiment as shown in FIGS. 10 and 11 a side arm 32 is shown which is connected via a connector part (side piece) 29 to the middle piece (not shown) of the eyeglass frame. The earpiece 32 and the connector part or side piece 29 are connected to one another via a common hinge or pivot joint 30, with its one hinge part 33 connected to the earpiece 32 and its other hinge part 34 connected to the side piece 29. Between the earpiece 32 and the connector part 29 metal sections 35 are inserted which are likewise attached to the hinge 30. On the inside of the hinge parts 33, 34 there is one carrier element 1 at a time, as is shown in FIGS. 1-3, while both the earpiece 32 and also the side piece 29 each have a connector part 8 which is slipped onto the respective carrier element 1 for the changing process. The connector part 8 is slipped onto the carrier element 1 in the direction indicated by the arrow 36 and 37. This proceeds in the manner shown in FIG. 4 and described in conjunction with FIG. 4.

FIG. 11 shows a version which has been modified relative to FIG. 10 to the extent that the two metal, parts 35 which are connected to the hinge parts 33, 34 are omitted.

Figure 12:
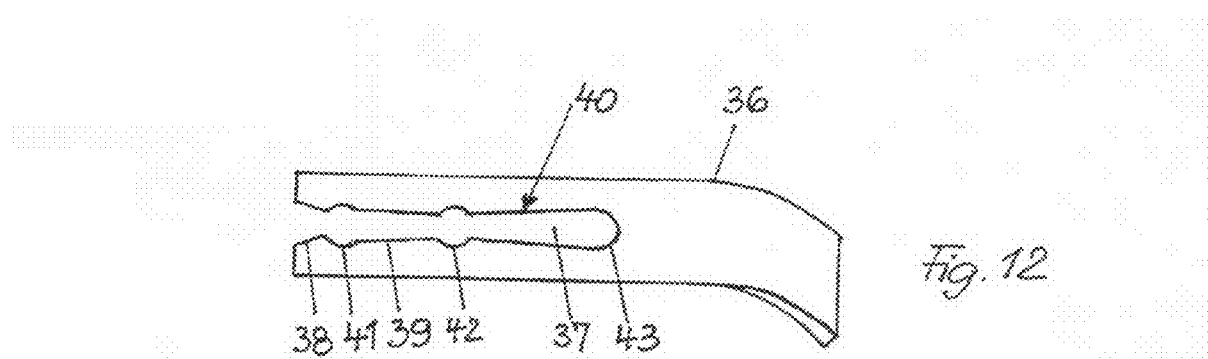
FIG. 12 shows a metal side piece of spring material.

FIG. 12 shows a metal side piece 36 of spring material with a slotted recess 37 which is made on the lens-side end, a conical insertion opening 38, two slotted conical sections 39, 40 which are each terminated by a widening recess 41, 42 and an end recess 43. The recesses 41, 42 are used to hold the threaded pins 5, 6 of the carrier element 1, and act as locking sites when the side piece is plugged onto the carrier element when parts of the eyeglass frame are to be changed.

Figure 13:
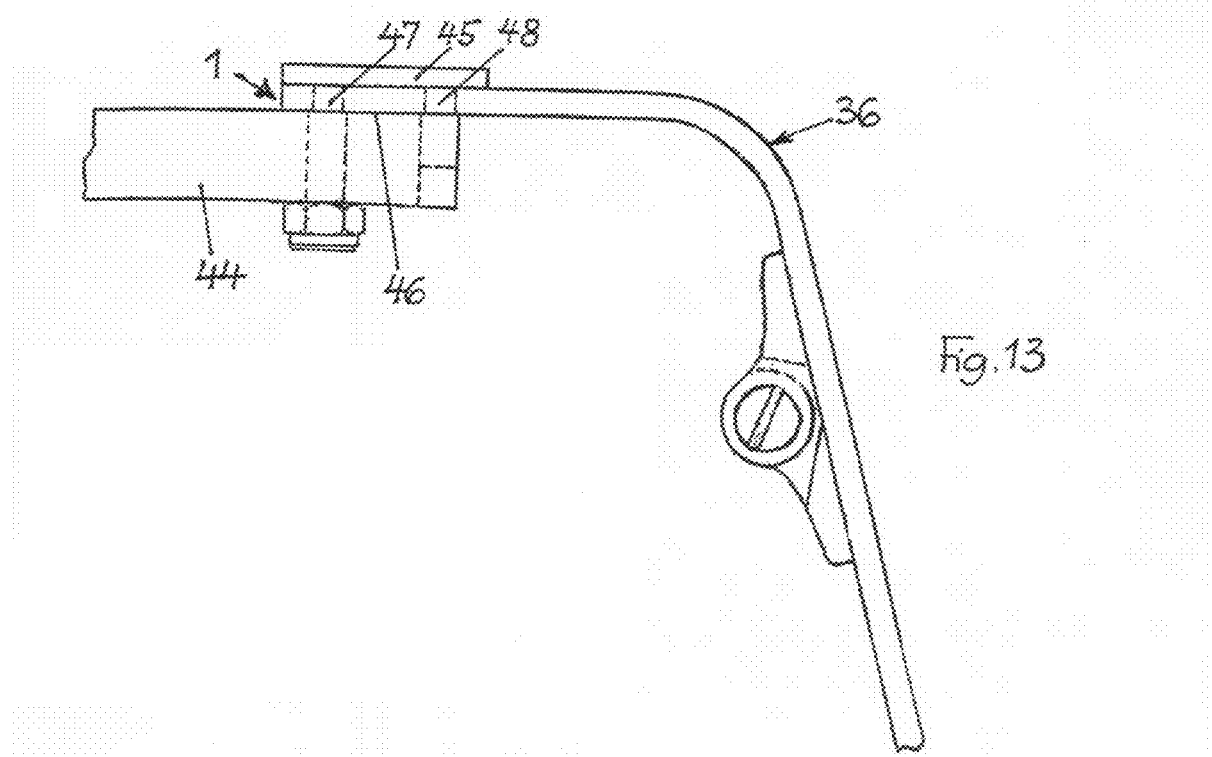
FIG. 13 shows the side piece as shown in FIG. 12 joined with the carrier earpiece on the eyeglass lens.

As shown in FIG. 13, in this embodiment the carrier element 1 which consists of the beam 45 with threaded pins 47 and 48 attached or molded on the bottom 46 is thus located on the eyeglass lens 44 such that between the bottom 46 of the beam 45 and the surface of the eyeglass lens 44 facing this bottom there is a free space for inserting the metal side piece 36, the outside of the beam 45 being matched in design to the visible side of the side piece and side arm and the opening end of the side piece with the two tines being pushed over the shafts 47 and 48 and the shafts each locking into one of the recesses 41, 42, 43 as far as the stop and thus yielding secure fixing of the side piece on the carrier element.

Figure 14:
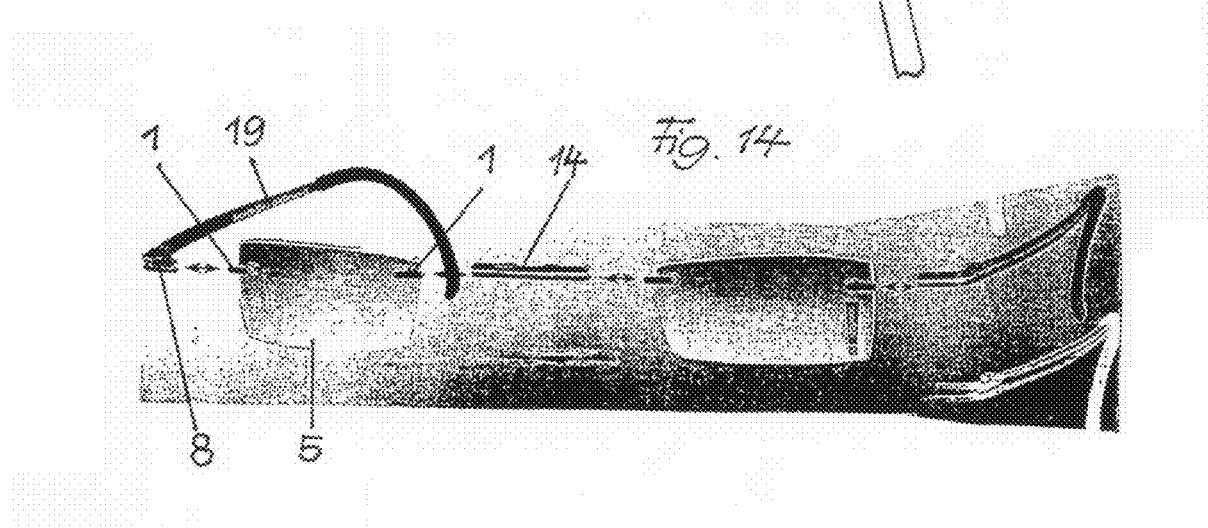
FIG. 14 shows an overall view of interchangeable eyeglasses with the plug-in device as claimed in the invention in an exploded view.

FIG. 14 shows interchangeable eyeglasses in an exploded view in which each eyeglass lens 5 on the left and the right side is assigned a carrier element 1, which for holding the connector part 8 is assigned for example to a side piece with a following side arm and a bridge in the nose region so that the eyeglass frame is changed by plugging the connector part 8 to the carrier element 1 and the bridge to the carrier element 1 in a positive manner and as far as the stop. The process of plugging proceeds in the direction of the arrow, specifically in the direction parallel to the plane of the lenses both when slipping the side piece from the outside to the inside onto the assigned carrier element 1 and when slipping the bridge from the inside to the outside onto the assigned carrier element 1.

The invention claimed is:

1. A device for interchangeable eyeglasses for changing of at least individual parts of a frame for rimless eyeglasses or full-framed eyeglasses, with carrier elements fixed on the edge of the lenses or on the edge of the frame for holding the side pieces and bridge in a supportive manner, said carrier elements are essentially rod-shaped, rail-shaped or plate-shaped component and attached to the lens or frame by means of a threaded pin and an additional positioning pin in an interchangeable manner, wherein the carrier element is positively connected to an interchangeable side piece, and an interchangeable bridge, in a direction parallel to the plane of the lens and in a direction of the lengthwise axis of the bridge by slipping or sliding on, and wherein a lens-side end of the interchangeable side piece, and the interchangeable bridge, has a recess matched to the shape and size of the carrier element with a length of the interchangeable side piece positively engaging the carrier element.

2. The device as claimed in claim 1, wherein the recess of the interchangeable side piece forms catch elements on the inside boundaries which are made to flexibly interact with the threaded pin and the additional positioning pin.

3. The device as claimed in claim 1, wherein the carrier element is a rod-shaped or surface-shaped plastic part with a threaded pin of metal and an additional positioning pin, the lens-side end of the metal interchangeable side piece has catch elements which are matched to the length of the carrier element with the length of the carrier element and positively engaging the catch elements, and the catch elements of the interchangeable side piece have catch sites on the inside metal boundaries which are made to interact with the threaded pin and the positioning pin.

4. The device as claimed claim 3, wherein a shaft of the carrier element is narrower than a diameter of the threaded pin of metal and the additional positioning pin wherein the side piece at the height of the threaded pin of metal and the additional positioning pin has catch elements in the form of bulges for holding the threaded pin of metal and the additional positioning pin by catching.

5. The device as claimed in claim 1, wherein the carrier element on the top of a T-beam has a vertical dimension which is small compared to the diameter of the side piece part.

6. The device as claimed in claim 1, wherein the carrier element consists of metal and wherein the interchangeable side piece, and the interchangeable bridge consist of plastic.

7. The device as claimed in claim 1 wherein the side pieces and side arms are made of spring material with a slotted recess which is made on the lens-side end and recesses located therein, which are made for positive holding of the threaded pins of the carrier elements when the side part is slipped onto the carrier element.

8. The device as claimed in claim 1, wherein the carrier element consists of metal and the interchangeable side piece, interchangeable bridge, or both, consists of metal, and wherein the lens-side end of the interchangeable side piece, interchangeable bridge, or both, is positively pushed or plugged in between the carrier element and the lens, the carrier element on its visible side being matched in color design to the interchangeable side piece consisting of spring material or the interchangeable bridge.

9. A process for changing eyeglass frames for rimless eyeglasses or full-framed eyeglasses, in which the side piece part ends and the bridge ends are each attached to the eyeglass middle part by a carrier element which is interchangeably connected to the interchangeable frame, and a mounting of the side piece part and the bridge is held by the carrier element, whereby
  a) in the lens on a bridge side and side piece side, holes are drilled for holding threaded pins of the carrier element, and
  b) the carrier element is fixed with two threaded pins of metal on the eyeglass frame or on the lens and tightened by nuts, wherein
  c) a connector part is slipped onto the carrier element in the direction parallel to the plane of the lens until the bulges within the connector part catch with the shafts of the two pins.

10. The process for changing eyeglass frames as claimed in claim 9 for rimless eyeglasses, wherein
  a) on the side outer boundaries of the lens for connection to the side piece parts a metal carrier element with a roughly T-shaped cross section and with positioning pins is attached,
  b) the connector part and the side arm of plastic have catch elements which is are matched to the shape of the carrier element with the length of the carrier element and surrounding the connector part, and
  c) the connector part of plastic is pushed onto the carrier element until the catch elements within the connector part engage the shaft of the threaded pins by catching and the connector part covers the carrier elements.

11. The process for changing eyeglass frames as claimed in claim 9, with a metal or plastic middle part, wherein
  a) on the side outer boundaries of the middle part one extension at a time is formed on the frame of the middle part,
  b) on the extension, a rod-shaped or plate-shaped carrier element of metal is attached with pins,
  c) the connector part or of the side arm is provided with a recess matched to the shape of the carrier element with the length of the carrier element and surrounding the connector part, and
  d) the connector part is pushed onto the carrier element until the catch elements within the connector part engage the shaft of the threaded pins by catching.

12. The process for changing side pieces and earpieces on eyeglass frames as claimed in claim 9, wherein the connector part adjoining the middle part is attached to the stationary part of the metal hinge and the earpiece is attached to the pivotable part of the metal hinge, and the connector part has a recess matched to the shape of the carrier element with the length of the carrier element and surrounding the connector part.

13. The process for changing side pieces and earpieces on eyeglass frames as claimed in claim 9, wherein
  a) the side piece is a metal earpiece of spring material with a slotted recess and at least two successive catch sites for positive holding of the two pins,
  b) the lens-side side piece part is inserted or pushed in between the lens top and the bottom of the T-beam of the carrier element, and
  c) the shafts of the pins are inserted or pushed in positively and under pressure to such an extent that the shafts become arrested in the catch sites.

* * * * *